Patented Dec. 6, 1938

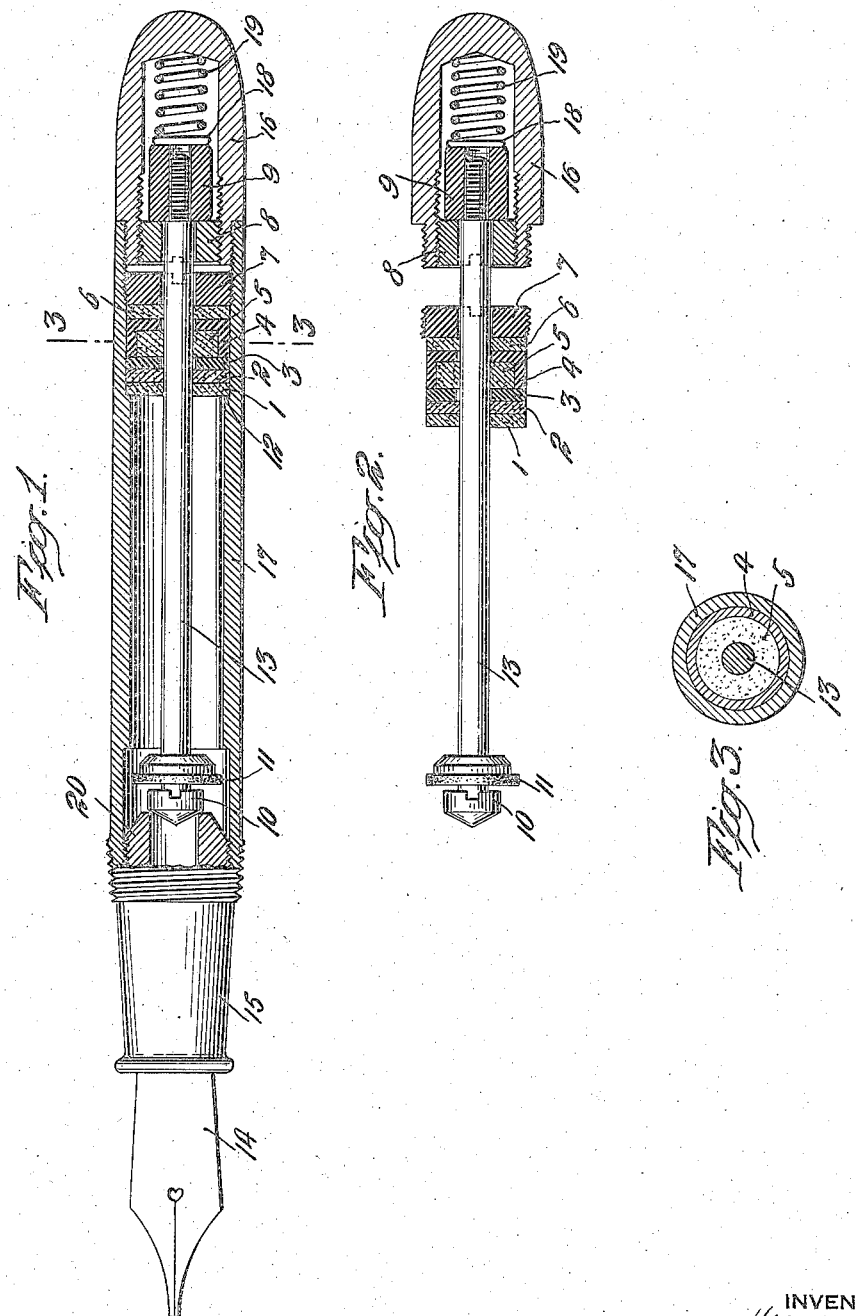

2,139,218

UNITED STATES PATENT OFFICE 2,139,218

FOUNTAIN PEN PACKING

Hitoshi Asai, Tokyo, Japan

Application December 21, 1935, Serial No. 55,515

1 Claim. (Cl. 286—35)

This invention relates primarily to an improved form of packing unit and piston rod assembly employed in self filling fountain pens or the like, wherein a piston rod and piston disc are arranged to be reciprocated in the pen barrel for filling the pen.

In fountain pens of the piston type, it is often difficult to make the pen leak-proof and at the same time provide for the ready removal of the piston rod and its associated piston disc for replacement or repairs; hence one object of the present improvement is to provide an interchangeable assembly and packing unit which may be readily inserted and withdrawn from the barrel of the fountain pen, thereby permitting repair or replacement of the piston rod, piston disc, or in fact the entire assembly of necessary, the latter being arranged to be completely withdrawn by simply removing the packing unit, which with the piston rod and its associated piston disc constitute the assembly unit.

Another important requirement is the satisfactory lubrication of the piston rod and piston disc. Hence, a further object of the present improvement is to provide a sealed oil cup or casing for the lubricant as part of the packing unit which in addition, is provided with a plurality of cooperating packing discs for not only sealing the oil cup tightly when the packing unit is clamped in place in the barrel of the pen, but for providing an ink-tight joint for the reciprocable piston rod, the arrangement, at the same time, making it possible to effectively supply lubrication in proper quantity to the piston rod and indirectly to the piston disc so as to facilitate long life and satisfactory wear for the moving parts of the piston fountain pen.

By the construction indicated, it will be readily apparent that the entire assembly, including the oil cup packing unit and the piston rod and piston disc may be readily removed and entirely separated from the barrel of the pen so that access may be had to the piston disc for cleaning and adjustment and to the elements of the packing unit for repair or replacement or to the oil cup for renewing the supply of oil in the absorbent material of the oil cup.

Other objects and advantages arising from the improved details of construction and the characteristic features of the invention will be apparent from the description in connection with the accompanying drawing, in which Fig. 1 is a longitudinal sectional view of a self filling fountain pen embodying the invention; Fig. 2 is a longitudinal sectional view of the interchangeable unit, including the packing unit, the piston rod and piston disc, shown with the end cap of the pen barrel in section; and Fig. 3 is a transverse sectional view taken on the line 3—3 of Fig. 1.

Referring to the drawing, it will be seen that the piston fountain pen is provided with a barrel 17, to the lower end of which is attached the usual nozzle finger piece 15 containing the pen nib 14, the finger piece 15 being provided at its inner end with a valve seat member 20, located in an enlarged counter bore in the end of the barrel for breaking the vacuum formed by the piston disc 11 when operated in the usual manner.

The piston disc 11 is loosely mounted at the lower end of the piston rod 13 between two fixed members, the lower member 10 of which, mounted on the end of the piston rod, is provided with a conical tip arranged to seat on the member 20 so as to close the opening therein leading to the pen, and to thereby prevent leakage when the pen is not in use.

At the other or upper end of the pen barrel the piston rod 13 passes through a packing unit mounted in a counterbore 12 in the barrel 17. The packing unit comprises, at its inner end, a gasket 1 of soft india rubber or other suitable material provided with a central opening arranged to fit snugly on the piston rod 13; the periphery of the gasket being arranged to fit snugly in the counter-bore 12 and rest on or engage the shoulder of the counter-bore substantially as shown in Fig. 1, the gasket making therewith substantially an air and ink tight joint, and a slidably tight joint with the piston rod.

Cooperating with the gasket 1 and backing it up, there is provided a first packing disc 2 of soft caoutchouc or india rubber composition of suitable character provided with a central aperture arranged to snugly fit the piston rod 13, while its periphery engages and snugly fits against the wall of the counter-bore 12, so as to form an air and oil tight joint therebetween.

It will be understood that with the soft rubber packing disc 2 fitting closely on the piston rod motion of the latter, during the operation of filling the pen, would tend to cause the soft rubber disc to bulge or move in or out with the piston rod, even though the latter is lubricated as hereinafter explained. However, the gasket 1 on one side of the packing disc 2 will prevent excess movement inward, and to prevent bulging movement in the other direction, it is preferable to provide a rigid disc 3 fitting the counter-bore 12 closely and having one face in direct contact with the soft rubber packing disc 2, to thereby prevent excess bulging thereof upward and furthermore to assist in maintaining the joints between the counterbore wall and piston rod tight. The rigid disc 3 is provided with an aperture through which the piston rod 13 slides, but the aperture is slightly larger than the diameter of the piston rod, so that there is no rubbing contact therebetween.

The rigid disc 3 has a further function, that is, it forms the cover for the casing of an oil chamber or cup 4, the periphery of which slidably fits the interior of the counterbore 12. The closed end of the oil cup 4 is provided with an aperture for the passage therethrough of the piston rod 13, the aperture being of larger diameter than the piston rod so that the latter will slide therein without rubbing on the wall of the aperture. The interior of the oil cup or casing 4 is preferably filled with an annular felt washer or disc 5 or other suitable oil absorbent material, the central aperture or opening being arranged to closely fit the piston rod 13, so that the latter in sliding in and out is lubricated. The felt or oil absorbent material in the oil cup or casing 4 is thoroughly saturated with oil of proper consistency to lubricate the piston rod; and to lubricate the piston disc itself by means of particles of oil that may be carried by the piston rod through the packing disc 2 and gasket 1 and floated by the ink into contact with the inner wall of the pen barrel, with which the piston disc comes into contact when it is reciprocated to fill the pen.

In close fitting contact with the bottom of the oil cup 4, there is provided another packing disc 6 of soft rubber or caoutchouc, of substantially the same character as the packing disc 2, and adapted to snugly fit the counterbore 12 and the piston rod 13, so as to provide oil and air-tight joints. The packing disc 6 provides a suitable tight packing for the closed end of the oil cup 4.

Beyond the last mentioned packing disc 6 there is provided a rigid annular compression member 7 having its periphery externally screw threaded to cooperate with internal screw threads in the upper end of the counterbore 12, as will be seen in Fig. 1 of the drawing.

It will be seen that by means of the rigid compression member 7 screwed into the outer end of the counterbore 12, the pressure on the various elements of the packing unit may be adjusted so that all the joints will fit snugly and be substantially ink and air tight; the only fluid getting through being the film of oil that is utilized in lubricating the piston rod 13, as it is moved through the packing unit.

The upper end of the fountain pen barrel is preferably provided with an end plug or cap member 16 which is screw threaded into the end of the barrel above the compression member 7 of the packing unit. This cap member 16 is bored out and internally threaded and provided with an apertured closing member 8 externally threaded to fit the internal threads of the cap, the aperture in the member 8 being slightly larger than the diameter of the piston rod 13, which is adapted to extend therethrough.

The upper end of the piston rod 13 is screw threaded and provided with a nut 9 tightly screwed thereon and arranged to rest on the inner face of the member 8; the nut 9 together with the piston rod 13 being arranged to be thrust downward or outward relative to the cap 16. By means of a spring 19 engaging the bottom of the bore of the cap and a metal disc 18 on the top of the nut 9. It will be understood that by this arrangement, the spring 19 is adapted to thrust the cone valve member 10 against the seat opening in the member 20 and prevent leakage at this point when the cap member 16 is fully screwed into the end of the pen barrel.

In this connection, it should be observed that by adjusting the annular member 8 in the end of the cap 16, the relative position of the cone valve member 10 can be adjusted so that the spring 19 may exert the desired amount of pressure to maintain the valve closed when the cap 16 is fully screwed into the end of the barrel 17. By this means, the adjustment may be such that one turn of the cap member will be sufficient to open the valve 10 and permit the flow of ink to the pen.

From the above, it will be seen that it is desired to obtain access to the piston rod or to the piston disc for repair or replacement or when it is necessary or desirable to renew the packing or clean out the oil cup and provide a fresh supply of oil, the entire unit can be withdrawn from the barrel of the pen by unscrewing the compression member 7; the withdrawn assembly or separated unit being substantially as shown in Fig. 2 of the drawing. When the assembly is thus withdrawn the piston rod or piston disc 13 may be readily replaced or cleaned and the assembly replaced in the barrel of the pen or if necessary or desirable, an entire new assembly unit may be inserted, thus facilitating quick repair or adjustment of the piston or packing.

Obviously, various modifications may be made in the construction and arrangement of the packing unit without departing from the spirit and scope of the invention.

I claim:—

Piston rod packing and lubricating means for fountain pens, the pen barrel being provided at one end with a counterbore internally threaded at its upper end and extending to an internal shoulder, comprising a piston rod, a cylindrical oil cup the bottom of which has a central opening through which the piston rod is movable, a close fitting disc cover over the open end of the oil cup and having a central hole of the same size as that in the bottom of the cup, the periphery of the cup and its cover being arranged to fit said counterbore, and said central openings through which the piston rod is movable being larger than said rod so as to allow free space therearound, an oil saturated disc of felt or the like within said cup and in contact with said piston rod for lubricating the latter, soft rubber packing discs mounted on and closely fitting the piston rod above said cover and below said oil cup, said soft rubber discs being arranged to fit closely within the counterbore, and means cooperating respectively with the shoulder and the threads of said counterbore for maintaining the soft rubber packing discs under sufficient pressure to keep the joints tight and to prevent the escape of oil from the oil cup except through said central openings so as to lubricate the piston rod.

HITOSHI ASAI.